United States Patent
Light et al.

(10) Patent No.: US 7,200,812 B2
(45) Date of Patent: Apr. 3, 2007

(54) METHOD, APPARATUS AND SYSTEM FOR ENABLING USERS TO SELECTIVELY GREEK DOCUMENTS

(75) Inventors: John J. Light, Beaverton, OR (US); Muralidharan Sundararajan, Portland, OR (US); Trevor A. Pering, Mountain View, CA (US); Roy Want, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 386 days.

(21) Appl. No.: 10/618,992

(22) Filed: Jul. 14, 2003

(65) Prior Publication Data

US 2005/0015723 A1    Jan. 20, 2005

(51) Int. Cl.
   *G06F 17/00*    (2006.01)
(52) U.S. Cl. ............... 715/540; 715/517; 715/523
(58) Field of Classification Search .............. 715/540, 715/517, 523
   See application file for complete search history.

(56) References Cited

U.S. PATENT DOCUMENTS

| | | | |
|---|---|---|---|
| 5,765,176 A | * | 6/1998 | Bloomberg ............... 715/514 |
| 5,903,905 A | * | 5/1999 | Andersen et al. ........... 715/526 |
| 6,789,231 B1 | | 9/2004 | Reynar et al. |
| 2005/0005240 A1 | | 1/2005 | Reynar et al. |

FOREIGN PATENT DOCUMENTS

| | | |
|---|---|---|
| CN | 1290901 A | 4/2001 |
| EP | 1 091 303 A2 | 4/2001 |
| EP | 1 091 303 A3 | 4/2001 |
| WO | WO92/16898 * | 10/1992 |

OTHER PUBLICATIONS

Weinmann, Elaine, QuarkXPress for Windows 4, Peachpit Press, 1998, pages cover, copyright page, and pp. 139 and 281.*
Knowlton (PCT Published Application, International Publication No.: WO 92/16898), which was published Oct. 1, 1992, in the English Language.*
Explanation of Relevance (Purusant to Rule 1.98(a) and 1.98(a)(3)(i) and (ii) - Art Reference No. CN 1317774A (Oct. 17, 2001) [1 page].

* cited by examiner

*Primary Examiner*—Heather R. Herndon
*Assistant Examiner*—Michael K. Botts
(74) *Attorney, Agent, or Firm*—Sharmini N. Green

(57) ABSTRACT

Documents may be greeked in whole or in part prior to viewing. Embodiments of the invention enable users to selectively greek and/or ungreek their documents for viewing in public locations. Various forms of greeking and/or ungreeking may be utilized to enable the user to view the document securely in whole or in part.

22 Claims, 4 Drawing Sheets

BANK OF UNITED STATES
555 MAIN STREET,
SMALLTOWN, XX 55555

June 1, 2003

| TRANSACTION #1 | Εασσ ευθδκισψ | ΙΔΣλλ |
| TRANSACTION #2 | Δλκικ Ρλδδλ | ΙΙΥΕΥΙ |
| TRANSACTION #3 | Δβκιε Ρβδυλ | ΙΙΔΔΥΙ |
| TRANSACTION #4 | Ρπα ενλδεισλ | ΙΚθΣΣ |
| TRANSACTION #5 | ξακι-ψ-σιο | ΙΥΔΕΕ |

BALANCE IN ACCOUNT   λθθΕΚΝΛΛ

SELECTIVELY GREEKED TEXT

BANK OF UNITED STATES
555 MAIN STREET,
SMALLTOWN, XX 55555

June 1, 2003

| TRANSACTION #1 | Cash withdrawal | $40.00 |
| TRANSACTION #2 | Check #5555 | $100.00 |
| TRANSACTION #3 | Check #5556 | $150.00 |
| TRANSACTION #4 | Cash withdrawal | $60.00 |
| TRANSACTION #5 | Point-of-sale | $35.50 |

BALANCE IN ACCOUNT $10,000.00

ACTUAL TEXT

FIG. 2

BANK OF UNITED STATES
555 MAIN STREET,
SMALLTOWN, XX 55555

June 1, 2003

| | | |
|---|---|---|
| TRANSACTION #1 | Cash withdrawal | $40.00 |
| TRANSACTION #2 | Δλκικ Ρλδδλ | ΙΙΥΕΥΙ |
| TRANSACTION #3 | Αβκαε ΡβδΥλ | ΙΙΔΛΥΙ |
| TRANSACTION #4 | Ρουα ενιδεωαλ | ΙΚθΣΣ |
| TRANSACTION #5 | ξακα-φ-σιιο | ΙΥΛΕΕ |

BALANCE IN ACCOUNT  λβ)ΒΚΝΛΛ

SELECTIVELY GREEKED TEXT

---

BANK OF UNITED STATES
555 MAIN STREET,
SMALLTOWN, XX 55555

June 1, 2003

| | | |
|---|---|---|
| TRANSACTION #1 | Cash withdrawal | $40.00 |
| TRANSACTION #2 | Check #5555 | $100.00 |
| TRANSACTION #3 | Check #5556 | $150.00 |
| TRANSACTION #4 | Cash withdrawal | $60.00 |
| TRANSACTION #5 | Point-of-sale | $35.50 |

BALANCE IN ACCOUNT $10,000.00

ACTUAL TEXT

FIG. 3

METHOD, APPARATUS AND SYSTEM FOR ENABLING USERS TO SELECTIVELY GREEK DOCUMENTS

FIELD

The present invention relates to the field of computing, and, more particularly, to a method, apparatus and system for enabling users to selectively greek and/or ungreek documents.

BACKGROUND

When using a computer screen in a public location, users necessarily run the risk of having someone else view their documents (by accident or otherwise). This lack of privacy may pose a significant problem to a user if the need to view sensitive and/or private documents arises while the user is in a public location. This is true whether the display screen is under the user's control (e.g., a personal notebook computer or personal digital assistant) or not (e.g., a screen in an Internet cafe or at a vendor/customer site.). This problem is further compounded by the fact that both sensitive and non-sensitive data may appear in the same document. A copy of an online bank statement, for example, may include highly sensitive information (e.g., balances, transactions, etc.) as well as less sensitive information (e.g., name of the bank, the bank's address, date, etc.). Even if the user is only interested in only one particular piece of information (e.g., whether a particular check has cleared), all the information in the bank statement will nonetheless be publicly displayed.

Thus, users currently either avoid accessing sensitive information, if possible, or they accept the risk of having their sensitive documents viewed by others. A number of existing techniques provide minimal protection to the user. For example, notebook screen filters, which severely limit the field of view of the screen, may offer the user some level of protection and privacy. Alternatively, users may have access to liquid crystal display ("LCD") screens that deliberately have the top polarizer removed, making them appear totally white to anyone who is not wearing glasses with the correct polarization filter angle. Yet another solution may be to segment the display of private and open information into separate screens, web pages, dialog boxes, etc. The author of the document may not, however, know where the document will be read and what the sensitivity of that information is in that environment. Segmentation may therefore be ineffective and/or cumbersome.

BRIEF DESCRIPTION OF THE DRAWINGS

The present invention is illustrated by way of example and not limitation in the figures of the accompanying drawings in which like references indicate similar elements, and in which:

FIG. 2 illustrates a greeked document according to an embodiment of the present invention;

FIG. 3 illustrates an ungreeked document according to an embodiment of the present invention.

DETAILED DESCRIPTION

Embodiments of the present invention provide a method, apparatus and system for enabling users to selectively greek and/or ungreek documents. The terms "greek," "greeking" and "greeked" are well known to those of ordinary skill in the art and typically include the use of unreadable and/or nonsensical characters to represent text in a document. The general purpose of greeking a document is to enable a user to view the layout of a document without necessarily viewing the actual text of the document. In other words, greeking is typically used when the user does not have to and/or want to read the actual text, but is rather interested only in the way the document will look (e.g., graphic designers may use greeked text to lay out columns, including the number of words, paragraphs, paragraph breaks and various other information typically required to properly generate text and/or graphics that fit the design layout). The unreadable and/or nonsensical characters thus represent the actual text that will ultimately be displayed and/or printed in the document, including the exact dimensions of the characters. "Ungreeking" as used herein refers to the reverse process of greeking, i.e., causing the greeked text to revert to the original, actual text for the user to view.

Reference in the specification to "one embodiment" or "an embodiment" of the present invention means that a particular feature, structure or characteristic described in connection with the embodiment is included in at least one embodiment of the present invention. Thus, the phrases "in one embodiment", "according to one embodiment" or the like appearing in various places throughout the specification are not necessarily all referring to the same embodiment.

Figure 1:
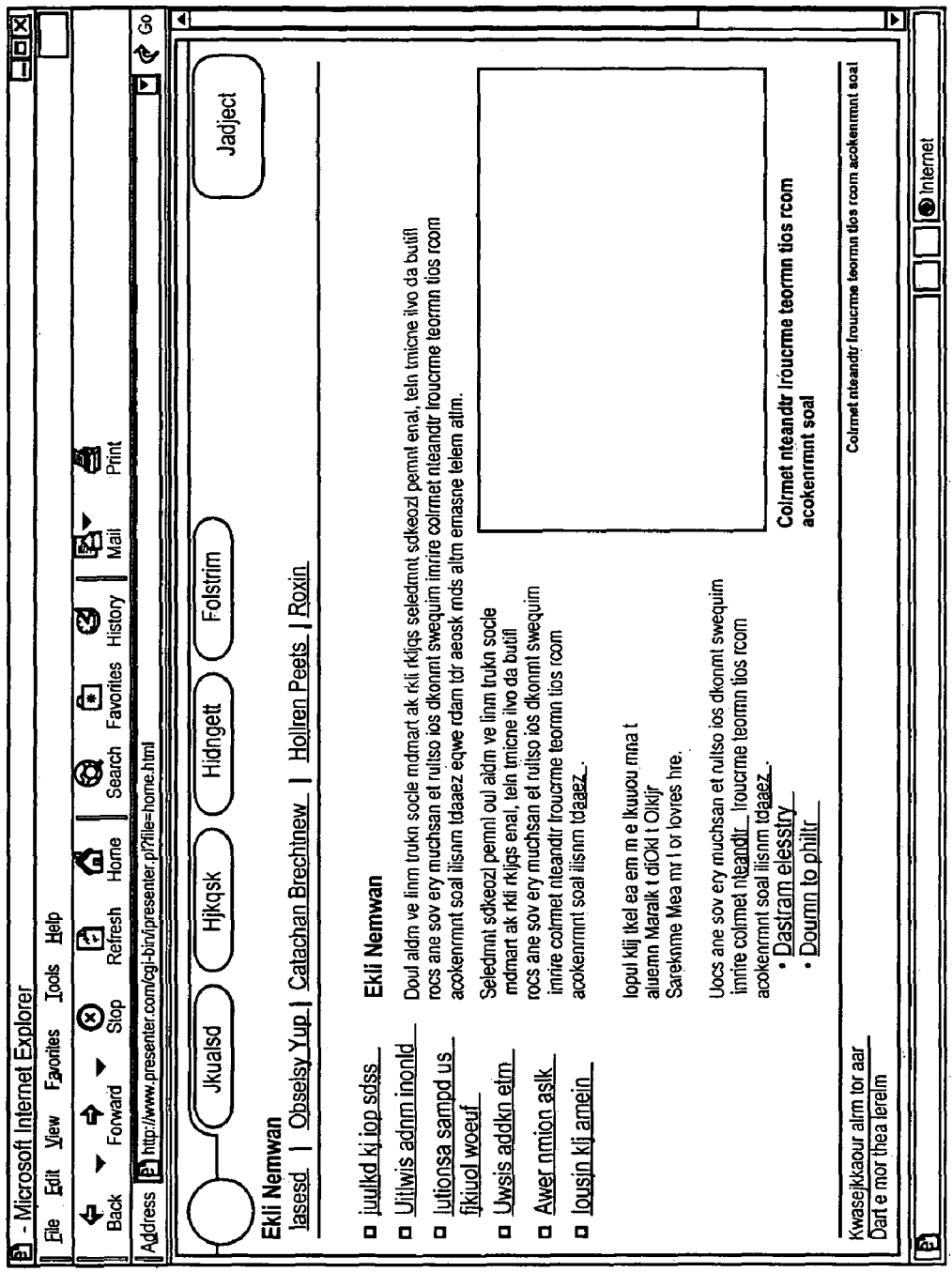
FIG. 1 illustrates an example of a greeked document.

FIG. 1 illustrates an example of a typical greeked document. As illustrated, the text in the document is greeked and may be used to view and perfect/confirm the page layout. For the purposes of this specification, the term "document" shall comprise any and all text characters (including letters, numbers, symbols, etc.) and/or figures viewable in electronic format, e.g., a web page within a web browser, a text page in a word processor, etc. Hereafter, references to "characters" and/or "text characters" shall include letters, numbers and symbols. As is typical, in FIG. 1, each text character in the document is greeked, i.e., the obscure graphics and/or obscure text are meant to represent the shape and size of the actual replaced text.

To enable secure viewing of sensitive documents in public locations, embodiments of the present invention enable users to greek documents prior to viewing. In other words, a user may either automatically or manually request that documents be greeked prior to being displayed for viewing. This technique enables users to open a document in public without fear of someone else viewing sensitive and/or private information. Since a greeked document is as unintelligible to the user as to strangers who may accidentally view the document, the user requires a mechanism to ungreek the document or portions of the document for viewing. Ungreeking is described in further detail below.

Embodiments of the present invention thus enable users to selectively greek and/or ungreek documents. Additionally, according to embodiments of the invention, users may selectively greek and/or ungreek documents at multiple levels. Thus, instead of the layout of the document, in embodiments of the present invention, the user is interested in the actual content of the document. The document is greeked to provide the user with privacy to selectively view the contents of the document. For example, FIG. 2 illustrates an example of a selectively greeked document according to an embodiment of the present invention. The illustrated example represents an approximation of the greeked text according to embodiments of the present invention. It will be readily apparent to those of ordinary skill in the art, however, that as implemented, the greeked text may more precisely match the dimensional characteristics of the actual text (e.g., in height and width).

In the illustrated example, only highly sensitive portions of the document (in this case, an online bank statement) are greeked. In alternate embodiments, the entire document may be greeked. Additionally, although the example of FIG. 2 illustrates each text character being individually greeked (i.e., each character representing sensitive information in the document is replaced with an alternate symbol or text), in other embodiments, the greeking may be performed at varying levels, e.g., a word, a line, a paragraph, or a page. In other words, instead of replacing each character of text with another character or symbol, each line, paragraph and/or page may be replaced with a symbol or other representation of the line, paragraph and/or page. In the example of FIG. 2, for example, the entire line representing "Balance In Account=$10,000" may be greeked into a symbol that represents the line. Thus, not only will the balance be hidden from view, nobody who accidentally views the document will even know that that line represents information about the current balance in the bank account.

Although not shown in FIG. 2, an embodiment of the invention also enables figures and/or graphics (hereafter collectively "figures") to be greeked. "Figures," as used herein, may include any and all graphical representations, including charts, graphs, drawings and/or photographs. Similar to greeking of text and/or numerical characters, actual figures may be replaced with alternate, greeked versions. In one embodiment, the actual figure may be replaced by a "figure symbol" i.e., one of a set of symbols designated to represent figures. In an alternate embodiment, the actual figure may be replaced by one of a predetermined set of generic figures (provided by the user and/or the owner of the document that includes the figure). In yet another embodiment, the actual figure may be replaced by a modified version of the actual picture wherein the modified version obscures the details of the figure. Regardless of the embodiment, figures may be un-greeked according to the same methods as greeked text (as described in further detail below). Any descriptions herein of greeked and/or ungreeked text and/or characters shall therefore also include greeked figures.

In yet other embodiments of the present invention, multiple levels of greeking may be applied to a document. Thus, in the above example of FIG. 2, each character of the information pertaining to various transactions and the total balance remaining in the bank account may be greeked. Additionally, in order to protect the entire line representing the total balance, the line may be greeked into a symbol. When the user ungreeks the line, the greeked characters may be viewed. Upon determining that the line contains information about the total balance in the account, the user may selectively apply ungreeking to the characters to view the actual text. It will be readily apparent to those of ordinary skill in the art that numerous levels of greeking and/or ungreeking may be applied to a document to provide varying levels of privacy.

As previously described, the greeking or substitution of obscure graphics and/or obscure text for the actual text is meant only to represent the shape and size of the replaced text. In embodiments of the present invention, the replacement greek text may not bear any recognizable resemblance to the original text or be repeatedly used to substitute for the same text or letters. In one embodiment, the greeking may be achieved by replacing each word with the smallest solid color rectangle that fully contains the individual characters of the word without extending below the text baseline. It will be readily apparent to those of ordinary skill in the art that other greeking techniques may also be implemented without departing from the spirit of embodiments of the present invention.

In one embodiment, the document may be greeked only in part while in an alternate embodiment, the entire document may be greeked. According to embodiments of the present invention, the user may selectively greek documents in a variety of ways. For example, the user may specify within his browser that all documents retrieved from a specific location should be greeked prior to display. Alternatively, the user may specify that specific fields (e.g., the numeric fields) in all documents should be greeked prior to display. In yet another embodiment, institutions may offer their customers the option of receiving greeked documents (e.g., a bank may offer online access to greeked account information). In this embodiment, the institutions may enable the user to ungreek the greeked document locally, i.e., using the user's local web browser. Alternatively, when a user attempts to ungreek portions of the greeked document, the request may be transmitted back to the institution to be processed, i.e., the ungreeking may be performed by a server at the institution and the ungreeked text may then be transmitted back to the user's local browser. It will be readily apparent to those of ordinary skill in the art that the documents may be greeked and/or ungreeked in a variety of ways in embodiments of the present invention. Embodiments of the present invention may include various features to facilitate the user's privacy requirements. For example, as described above, the user may selectively greek the document, e.g., greek the entire document, greek only specific fields in the document, etc. Additionally, the user may greek the document at varying levels, e.g., by word, by line, etc., and/or multiple times, e.g., first greeking a word, then greeking the line the word appears in, etc. Thus, for example, in an embodiment of the invention, only sensitive portions of the document may be greeked. The user may specify, and/or the document's author may automatically provide, metadata tags to be manually inserted into the document to identify sensitive information. Metadata tags are well known to those of ordinary skill in the art and typically comprise tags that describe the data. In yet another embodiment, the greeking scheme may be designed to recognize sensitive fields (e.g., numeric and monetary value fields). In this example, the numeric and monetary fields may always be represented with a maximal field size (within the space available) and specific greeking may be used to indicate a numeric field. This feature would make it harder for an observer to recognize the number of digits in the greeked text that would otherwise be recognizable as numbers. Similarly, the user may selectively greek numbers in groups, instead of individually. For example, instead of greeking each number in the total "$10,000" the user may instead greek the entire total into one symbol. Alternatively, the user may greek each number in the total, and also greek the entire total into a symbol or character, to disguise the fact that that the text includes numbers.

According to embodiments of the present invention, the user may ungreek greeked document in various ways. In the example of the bank statement above, the user is likely to be familiar with the general location of the list of transactions. As such, the user may selectively ungreek the area within the document where the list of transactions typically appears. This selection may be accomplished in a variety of ways. For example, in one embodiment, the user may select the text using the typical text selection mechanism (e.g., pointing to the beginning of text, clicking and holding the mouse, dragging the mouse to the end of the text and releasing). Upon selection of the greeked text, the user may specify and/or perform an action. In one embodiment, the user may specify that the text within the selected text box should be ungreeked in the current view. Alternatively, the user may copy and paste the text into a new document. In one embodiment, the actual text may be placed into the clipboard when the greeked text is copied and the text that is pasted into the new document will be the actual, ungreeked text. If, however, the user has access to a greeking-enabled word processor and/or email program (i.e., one in which the clipboard recognizes the tags that indicate that the text is greeked), the user may selectively choose to keep the text greeked (e.g., to email the text securely in greeked form to someone else).

FIG. 3 illustrates an example of a user selectively ungreeking a document according to an embodiment of the present invention. As in FIG. 2, the illustrated example in FIG. 3 represents an approximation of the greeked text according to embodiments of the present invention. It will be readily apparent to those of ordinary skill in the art, however, that as implemented, the greeked text may more precisely match the dimensional characteristics of the actual text (e.g., in height and width). The example in FIG. 3 illustrates a bank statement that is greeked in part. More specifically, the highly sensitive information in the bank statement is greeked, and in order to view a transaction, for example, the user may selectively ungreek that particular transaction. In this embodiment, the user may ungreek the text by using the typical text selection mechanism to select the greeked text. In alternate embodiments, as described below, however, the user may use other techniques to ungreek the text. In other words, any of the mechanisms described below for users to select text for greeking may be equally applicable for users to select text for ungreeking.

Thus, according to embodiments of the present invention, a user may selectively greek and/or ungreek documents to maintain privacy and the security of the information in their documents. Although many online entities, for example, currently display all but the last four digits of stored credit card numbers with asterisks or Xs, there are no provisions for anyone, including the user, to view the entire number. In other words, although these online entities may attempt today to protect sensitive information, this protection is indiscriminate and does not allow even the user and/or owner of the document to selectively view the actual text of the documents (in this case, credit card numbers). According to embodiments of the present invention, these online entities may, for example, greek the credit card numbers for display and enable the user to selectively and securely ungreek the entire credit card number for viewing. It will be readily apparent to those of ordinary skill in the art that a variety of security mechanisms may be implemented in the above example without departing from the spirit of embodiments of the present invention.

Text may be selected for greeking and/or ungreeking in a variety of ways. As described above, a typical text selection mechanism may be used. In alternate embodiments of the invention, the user may also select text by specifying a region on the screen (e.g., marking the upper left and lower right corners of the region, thus selecting all the text within the region), by using a movable region that temporarily ungreeks the text within its boundaries, and/or by providing a small movable region that acts as a greeking "eraser" (i.e., the areas that the rectangle moves over become ungreeked). In yet another embodiment, the document may be presented in a solid color, and any area selections within the solid area (point to upper left, click and hold, drag to lower right, release) would reveal the greeked contents underneath. Additionally, in one embodiment, a simple keyboard binding or mouse gesture may be designed to immediately restore the document to its original greeked or solid state. This would allow a quick response to a change in circumstances for the user (e.g., if the user senses a presence behind him, he may immediately "hide" all the ungreeked portions of the document).

It will be readily apparent to those of ordinary skill in the art that in order to implement embodiments of the present invention, modifications may be made to any existing application to enable support for greeking/ungreeking. For example, in order for a user to request greeked documents and ungreek these documents selectively on the Internet, the user's browser may be modified to support the greeking and ungreeking described herein. In another embodiment, the user may desire to request greeked documents for viewing within a word processing application. Similar to the browser, the user's word processing application may also be "greeking" enabled. These modifications may be made in the form of add-ins and/or plug/ins to existing applications. Alternatively, the features of embodiments of the invention may be incorporated into the applications as part of the core product.

Figure 4:
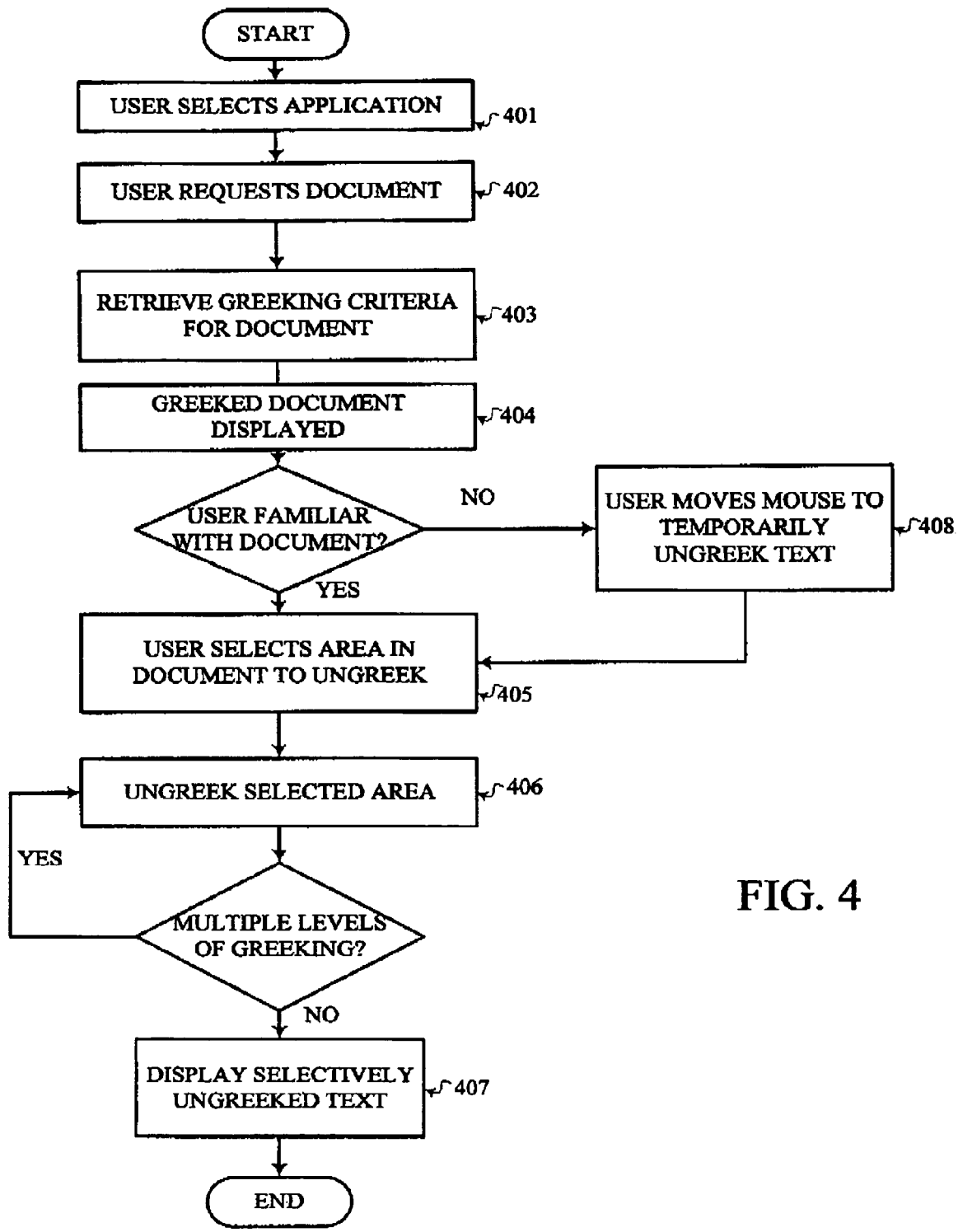
FIG. 4 is a flow chart illustrating an embodiment of the present invention.

FIG. 4 is a flow chart illustrating an embodiment of the present invention. Although the operations may be described as sequential processes, many of the operations may in fact be performed in parallel or concurrently. In addition, the order of the operations may be re-arranged without departing from the spirit of embodiments of the invention. In 401, a user may select a greeking-enabled application to view a document. i.e., the application is capable of recognizing/understanding tags or other such information that specifies the type of greeking desired for a document. In 402, the user may specify a document he wishes to view. When the document is retrieved, in 403, the greeking criteria for the document is also retrieved. The criteria may be defined within the application and/or the document. Thus, for example, the user may configure his web browser and/or word processing application to specify the level of greeking desired (e.g., greeking by character, by word, by line, etc.), and/or the type of information to be greeked (e.g., only numeric characters are to be greeked, while text characters remain ungreeked, etc.). Alternatively and/or in addition to the user specified criteria, a third party may also specify the greeking characteristics of a particular document by including the greeking criteria with the document. For example, a bank may configure all bank statements to include metadata tags to greek particular fields in the online statements. In 404, the greeked document is displayed on the user's display device.

If the user is familiar with the layout of the document and knows where to find the information he is interested in, the user may select the area containing the information he desires to view in 405, and in 406, the user may ungreek the selected area. It will be readily apparent to those of ordinary skill in the art that the user may select the text for ungreeking in a variety of ways without departing from the spirit of embodiments of the present invention. In the event the selected area has multiple levels of greeking (e.g., greeking by character, by word, by line, etc.), then the user in 407 may continue to ungreek the selection until he arrives at the actual text. In an alternate embodiment, in 408, if the user is unfamiliar with the layout of the document and is uncertain where to find the information he is interested in, the ungreeking mechanism may be configured to allow the user to simply move his mouse over text to temporarily ungreek the text (i.e., the text may be ungreeked only while the mouse and/or a region controlled by the mouse remains over the text). In this embodiment, the user may peruse portions of the document using this mechanism until he identifies the location of the information he is interested in. Upon identifying the location of the information in 409, the user may then select the area containing the information in 405 and ungreek the selected area in 406. As previously described, if the selected area includes multiple levels of greeking, the ungreeking process may continue until the actual text is visible. In 407, the ungreeked information may then be displayed on the user's display device. It will be readily apparent to those of ordinary skill in the art that the above merely describes an embodiment of the invention and that a variety of other embodiments may be possible.

Embodiments of the present invention may be implemented on a variety of data processing devices. It will be readily apparent to those of ordinary skill in the art that these data processing devices may include various types of software. According to an embodiment of the present invention, the data processing devices may also include various components capable of executing instructions to accomplish an embodiment of the present invention. For example, the data processing devices may include and/or be coupled to at least one machine-accessible medium. As used in this specification, a "machine" includes, but is not limited to, any data processing device with one or more processors. As used in this specification, a machine-accessible medium includes any mechanism that stores and/or transmits information in any form accessible by a data processing device, the machine-accessible medium including but not limited to, recordable/non-recordable media (such as read only memory (ROM), random access memory (RAM), magnetic disk storage media, optical storage media and flash memory devices), as well as electrical, optical, acoustical or other form of propagated signals (such as carrier waves, infrared signals and digital signals).

According to an embodiment, a data processing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. A host bus host controller such as a Universal Serial Bus ("USB") host controller may be coupled to the bus(es) and a plurality of devices may be coupled to the USB. For example, user input devices such as a keyboard and mouse may be included in the data processing device for providing input data.

In the foregoing specification, the invention has been described with reference to specific exemplary embodiments thereof. It will, however, be appreciated that various modifications and changes may be made thereto without departing from the broader spirit and scope of embodiments of the invention, as set forth in the appended claims. The specification and drawings are, accordingly, to be regarded in an illustrative rather than a restrictive sense.

What is claimed is:

1. A method of displaying a document on a viewing screen, comprising:
    enabling display of at least one page of the document on the viewing screen;
    enabling greeking of a portion of the at least one page by an application prior to enabling display of the at least one page; and
    enabling a user to selectively ungreek at least a portion of the greeked portion of the at least one page.

2. The method according to claim 1 wherein enabling greeking of the portion of the at least one page further comprises at least one of:
    enabling the user to selectively greek the portion of the at least one page; and
    enabling a third party to selectively greek the portion of the at least one page.

3. The method according to claim 1 wherein the application comprises at least one of a web browser, a word processing application, a spreadsheet and an electronic mail application.

4. The method according to claim 1 further comprising enabling the user to re-greek the portion of the at least one page that is ungreeked.

5. The method according to claim 4 wherein enabling the user to re-greek the portion of the at least one page that is ungreeked comprises at least one of utilizing a single keystroke, a combination of keystrokes and a mouse gesture to re-greek the portion of the at least one page.

6. The method according to claim 1 wherein enabling greeking of the portion of the at least one page further comprises enabling greeking of a selected region in the at least one page.

7. The method according to claim 6 wherein enabling greeking of the selected region in the at least one page further comprises at least one of:
    enabling greeking of a character in the at least one page;
    enabling greeking of a word in the at least one page;
    enabling greeking of a line in the at least one page;
    enabling greeking of a paragraph in the at least one page;
    enabling greeking of a page in the at least one page; and
    enabling greeking of a figure in the at least one page.

8. The method according to claim 6 wherein enabling greeking of the portion of the at least one page further comprises at least two of:
    enabling greeking of the character in the at least one page;
    enabling greeking of the word in the at least one page that includes the character;
    enabling greeking of the line in the at least one page that includes at least the character and the word;
    enabling greeking of the paragraph in the at least one page that includes at least one of the character, the word and the line; and
    enabling greeking the page in the at least one page that includes at least one of the character, the word, the line and the paragraph.

9. An article comprising a machine-accessible medium having stored thereon instructions that, when executed by a machine, cause the machine to:
    enabling display of at least one page of the document on the viewing screen;
    enabling greeking of a portion of the at least one page by an application prior to enabling display of the at least one page; and
    enabling a user to selectively ungreek at least a portion of the greeked portion of the at least one page.

10. The article according to claim 9 wherein the instructions, when executed by the machine, further cause the machine to perform at least one of:
    enabling the user to selectively greek the portion of the at least one page; and enabling a third party to selectively greek the portion of the at least one page.

11. The article according to claim 9 wherein the instructions, when executed by the machine, further cause the machine to enable the user to re-greek the portion of the at least one page that is ungreeked.

12. The article according to claim 9 wherein the instructions, when executed by the machine, further cause the machine to enabling greeking of a selected region in the at least one page.

13. The article according to claim 12 wherein the instructions, when executed by the machine, further cause the machine to perform at least one of:
enabling greeking of a character in the at least one page;
enabling greeking of a word in the at least one page;
enabling greeking of a line in the at least one page;
enabling greeking of a paragraph in the at least one page;
enabling greeking of a page in the at least one page; and
enabling greeking of a figure in the at least one page.

14. The article according to claim 13 wherein the instructions, when executed by the machine, further cause the machine to perform at least two of:
enabling greeking of the character in the at least one page;
enabling greeking of the word in the at least one page that includes the character;
enabling greeking of the line in the at least one page that includes at least the character and the word;
enabling greeking of the paragraph in the at least one page that includes at least one of the character, the word and the line; and
enabling greeking the page in the at least one page-that includes at least one of the character, the word, the line and the paragraph.

15. A method of displaying a document, comprising:
enabling display of at least one page of a greeked document, the document being greeked by an application prior to display; and
enabling a user to selectively ungreek a portion of the at least one page for viewing.

16. The method according to claim 15 wherein enabling display of at least one page of the greeked document further comprises at least one of:
enabling display of at least one page of the document having a greeked portion according to the user's preferences; and
enabling display of at least one page of the document having a greeked portion according to a third party's preference.

17. The method according to claim 15 wherein enabling display of the at least one page of the document having the greeked portion further comprises enabling display of a selected greeked region of the greeked portion of the at least one page of the document.

18. The method according to claim 17 wherein enabling display of the selected greeked region in the greeked portion of the at least one page of the document further comprises enabling display of at least one of:
a greeked character in the greeked portion of the at least one page;
a greeked word in the greeked portion of the at least one page;
a greeked line in the greeked portion of the at least one page;
a greeked paragraph in the greeked portion of the at least one page;
a greeked page in the greeked portion of the at least one page; and
a greeked figure in the greeked portion of the at least one page.

19. The method according to claim 18 wherein enabling display of the document having the greeked portion further comprises enabling display of at least two of:
the greeked character in the greeked portion of the at least one page;
the greeked word in the greeked portion of the at least one page that includes the greeked character;
the greeked line in the greeked portion of the at least one page that includes at least one of the greeked character and the greeked word;
the greeked paragraph in the greeked portion of the at least one page that includes at least one of the greeked character, the greeked word and the greeked line; and
the greeked page in the greeked portion of the at least one page that includes at least one of the greeked character, the greeked word, the greeked line and the greeked paragraph.

20. The method according to claim 19 wherein enabling the user to selectively ungreek the portion of the greeked portion of the at least one page for viewing further comprises enabling the user to selectively ungreek at least one of:
the greeked character in the greeked portion of the at least one page;
the greeked word in the greeked portion of the at least one page that includes the greeked character;
the greeked line in the greeked portion of the at least one page that includes at least one of the greeked character and the greeked word;
the greeked paragraph in the greeked portion of the at least one page that includes at least one of the greeked character, the greeked word and the greeked paragraph; and
the greeked page in the greeked portion of the at least one page that includes at least one of the greeked character, the greeked word, the greeked line and the greeked paragraph.

21. A system for displaying a document, comprising:
a processor capable of executing instructions to cause an application to selectively greek a portion of at least one page of the document, the processor further capable of executing instructions to selectively ungreek the greeked portion of the at least one page in the document; and
a display device capable of displaying the at least one page of the document in a greeked format and an ungreeked format.

22. The system according to claim 21 wherein the application comprises at least one of a web browser, a word processing application, a spreadsheet and an electronic mail application.

* * * * *